(12) United States Patent
Hamid et al.

(10) Patent No.: US 6,877,097 B2
(45) Date of Patent: Apr. 5, 2005

(54) SECURITY ACCESS METHOD AND APPARATUS

(75) Inventors: Larry Hamid, Ottowa (CA); Derek Bouius, Ottowa (CA); Albert Hum, Ottawa (CA)

(73) Assignee: ActivCard, Inc., Fremont, CA (US)

( * ) Notice: Subject to any disclaimer, the term of this patent is extended or adjusted under 35 U.S.C. 154(b) by 913 days.

(21) Appl. No.: 09/812,833

(22) Filed: Mar. 21, 2001

(65) Prior Publication Data

US 2002/0138767 A1 Sep. 26, 2002

(51) Int. Cl.[7] .................................................. H04L 9/32
(52) U.S. Cl. ........................ 713/186; 713/200; 713/202; 713/182; 713/185; 382/115; 382/124; 382/116; 382/125; 340/5.8; 340/5.82; 340/10.42; 340/523; 340/541; 340/572.4; 902/3; 705/5; 705/54; 707/3; 707/6
(58) Field of Search ............................... 713/186, 185, 713/200, 201, 202, 182; 382/115, 116, 124, 125; 340/5.8, 5.82, 10.42, 541, 572.4, 572.7, 523; 902/3; 707/3, 6; 705/54, 5

(56) References Cited

U.S. PATENT DOCUMENTS

| | | | | |
|---|---|---|---|---|
| 6,047,281 A | * | 4/2000 | Wilson et al. .................. | 707/3 |
| 6,122,394 A | * | 9/2000 | Neukermans et al. ........ | 382/124 |
| 6,219,439 B1 | * | 4/2001 | Burger ........................ | 382/115 |
| 6,311,272 B1 | * | 10/2001 | Gressel ........................ | 713/186 |
| 6,317,544 B1 | * | 11/2001 | Diehl et al. .................. | 385/115 |
| 6,320,974 B1 | * | 11/2001 | Glaze et al. ................. | 382/115 |
| 6,327,376 B1 | * | 12/2001 | Harkin ........................ | 382/124 |
| 6,484,260 B1 | * | 11/2002 | Scott et al. .................. | 713/186 |
| 6,628,810 B1 | * | 9/2003 | Harkin ........................ | 382/116 |
| 6,720,874 B2 | * | 4/2004 | Fufido et al. ................ | 340/541 |
| 6,751,734 B1 | * | 6/2004 | Uchida ........................ | 713/186 |
| 6,798,898 B1 | * | 9/2004 | Patton et al. ................ | 382/128 |

* cited by examiner

Primary Examiner—Ly V. Hua
(74) Attorney, Agent, or Firm—Freedman & Associates (57) ABSTRACT

A portable biometric device enables a designated person to unlock any one portal exclusive of other portals of a secure entity and or a secure service by choosing which of their personal biometric characteristics is presented to the portable biometric device. The portable biometric device includes a biometric sensor such that a biometric characteristic of a person for example a finger pattern is read dependent upon the person presenting the biometric characteristic to the biometric sensor. The reading is encoded in order for a processor to determine if the biometric characteristic has been predesignated for access via a predesignated one of the plurality of portals. If so, the processor selects an appropriate authorization code which is communicated by wireless transmission for unlocking the predesignated one of the portals, to the exclusion of any other of the portals. In an alternate example the processor is a central controller remote from the biometric device. The central controller is responsive to a wireless transmission of the encoded reading, from the portable biometric device, for determining which one if any of the predesignated portals is to be unlocked.

24 Claims, 4 Drawing Sheets

SECURITY ACCESS METHOD AND APPARATUS

The present invention is in the field of machine automated security for permitting access to a service or a predefined area by a designated person or persons. More particularly the invention relates to a portable security device being responsive to a biometric characteristic of the designated person for communicating with a facility for permitting such access.

BACKGROUND OF THE INVENTION

A secure area or service is that to which a designated or authorised person is permitted to have entrance or access. One of the most reliable means for ensuring that access to a particular area or facility is limited to only those persons of proper authorization is that of operating a manned security station, for human recognition and verification of persons designated for entry and or egress. Operating a manned security stations is very expensive. Of lesser degrees of expense are other mechanical and or electrical locking devices intended to prevent a door or other object from being opened, moved, or operated.

The oldest key-operated lock still in existence was found in the citadel of King Sargon II. The citadel was built in the Assyrian capital of Khorsabad in the late 700's B.C. Similar locks are shown in Egyptian art dating from about 2000 B.C.

A key-operated lock opens after a person inserts and turns the correct key. Such keys may be lost and such locks are sometimes of little deterrent to a practised and determined intruder.

A combination lock is opened by pressing a series of buttons on a keypad or by turning a dial to the correct sequence of numbers or letters. However entry codes or combinations are often forgotten, as users have no reliable method of remembering them. A written record of a preset code, particularly if kept in close proximity to a keypad, tends to be self-defeating. Regular code changes may improve security but the nuisance for both users and administrators discourages such precaution.

A password lock is similar to a combination lock but usually permits a user to determine their personal password. Most users choose passwords, which are easily remembered such as a birthday, a name of a pet or a nickname. A potential intruder with a little research into the backgrounds of a few designated users may derive a short list of potential passwords and hence many password systems may be accessed through a simple trial and error process.

Some electronic locks are opened by inserting a specially coded "key card", that is cards or keys that have their codes on a microchip or a magnetic strip. A device reads the code and sends the information to a computer. If the code matches the one in the computer's memory, the locking mechanism is released. A potential intruder is usually discouraged by a key card reading security system, unless the intruder is in possession of a card which may have been sold, lost or stolen. Further, when there is no human monitored security at a particular portal, the unauthorized use of a key card is not detectable posing a significant security threat.

Some other electronic locks are opened after a computer has identified a biometric feature of the person desiring access. A biometric characteristic security system identifies a person by using a computer to compare the unique features of a fingerprint, palm, foot, voice, eye, signature or the like, with the a one in its memory. In a fingerprint system, for example, a person who wants to open a door, places his or her finger on a plate or platen mounted on or nearby the door. A scanner scans the finger's print and if it matches predeposited information in the computer's memory, the door is unlocked.

One disadvantage of biometric security systems is that the improved security offered by such systems is often overshadowed by the capital cost associated with purchase installation and administration. As such biometric security systems are typically limited to use in high-security areas, such as nuclear power plants and the like. Such systems are economically impractical for security in relation to small facilities such as multiple unit dwellings, or an individual residence, for example.

Another disadvantage of all the security access systems so far reviewed is that of being vulnerable to being rendered inoperative by vandalism. For example, a keyway or card slot may be filled with some foreign substance rendering the lock inoperative and denying access to all. Furthermore any mounted publicly accessible card reader, keypad, keyboard, or platen of a biometric characteristic reader, may be smashed with a heavy instrument or otherwise rendered inoperative.

One solution to the problem of vandalism has been to provide each user with a hand-held portable fingerprint recognition and transmission device, for example as disclosed in U.S. Pat. No. 6,111,977 to Scott et al. Their device includes a fingerprint scanner that encodes a fingerprint and sends the encoded fingerprint, via an infrared or a radio frequency transmitter, to a receiver in the secure item, facility or area. It is nonetheless necessary to have a central computer that analyzes the encoded fingerprint to allow recognition and authorization of an individual. The fingerprint scanner functions in conjunction with a keypad with several push buttons for selecting specific operations. By way of illustration one may consider for example, in combination with the correctly acceptable fingerprint, one push button will open all the doors of a car, while another push button opens only the car's trunk. The keypad may also be used for activating the fingerprint scanner.

The fingerprint scanner may be provided by a mechanism having a prism and a light source for reading the print of a finger or a thumb. The prism has a first or platen surface upon which a finger is placed. A second surface is disposed at an acute angle to the first surface to pass light reflected from the finger. A light is directed into the prism through a third or illuminated surface to illuminate the finger. Various examples of finger print reading devices using prisms are disclosed in U.S. Pat. Nos. 5,109,427 and 5,187,482 and 5,187,748 and 5,233,404.

A capacitive array fingerprint sensor is disclosed in U.S. Pat. No. 4,353,056 issued to Tsikos on Oct. 5, 1982. The described sensor has a two dimensional, row and column, array of capacitors, each comprising a pair of spaced electrodes, carried in a sensing member and covered by an insulating film. The sensors rely upon deformation to the sensing member caused by a finger being placed thereupon so as to vary locally the spacing between capacitor electrodes, according to the ridge and trough pattern of the finger, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation caused by the surface of the finger.

From a users viewpoint the hand-held security device disclosed by Scott et al is relatively bulky as compared to a key or a coded card and it may be misplaced lost or stolen.

From a manufactures viewpoint, reliability of the keypad in the hand-held security device is somewhat proportional to the expense of providing it. Although it is desirable to be able to provide an inexpensive mass producible the hand-held portable device, inexpensive key pad push buttons and the like are well known to become unreliable with frequent use. One possible modification of the Scott et al device is to eliminate the push buttons, however it is at least inconvenient and possibly a security risk to have all the car doors and the trunk unlock together, at the same time.

It is an object of the instant invention to enable a person to unlock any one portal exclusive of other portals by choosing which of their personal biometric characteristics is presented to a portable biometric device.

SUMMARY OF THE INVENTION

A portable biometric device, in accordance with the invention, is for use by a designated person in combination with a secure entity and or a secure service, which is accessible via a plurality of portals, each of which is exclusively operable in response to a wireless transmission of a corresponding authorization code which is selected by the designated person choosing which of a plurality of their predesignated biometric characteristics is presented to the portable biometric device.

A portable biometric device in accordance with an aspect of the invention is used by a designated person in combination with a secure entity and or a secure service, which is accessible via a plurality of portals, each of which is exclusively operable in response to a corresponding authorization code. The portable biometric device includes a biometric sensor for reading a biometric characteristic of a person dependent upon the person presenting said biometric characteristic to the biometric sensor; a digital encoder for encoding a reading of the biometric characteristic, from the biometric sensor, to provide an encoded description of the biometric characteristic; a processor responsive to the encoded description of the presented biometric characteristic for determining if the biometric characteristic is predesignated for access via a predesignated one of the plurality of portals, and if so, selecting the authorization code for unlocking said predesignated one of the portals; and a wireless transceiver for transmitting the selected authorization code to the secure entity and or service; whereby said designated person, exclusive of an other person, is able to choose which of the plurality of portals is to be unlocked for their access.

In accordance with a further aspect of the invention, in the portable biometric device the biometric sensor is for reading a sequence of presented biometric characteristics; the digital encoder provides an encoded description of the sequence of biometric characteristics; the processor includes at least a plurality of predefined data each representative of a predesignated one of the biometric characteristics of the designated person, and said selection, of said corresponding authorization code, is contingent upon the processor detecting a substantial match between the encoded description of the sequence of biometric characteristics and a similar sequence of ones of the plurality of predefined data.

In accordance with a yet further aspect of the invention, in the portable biometric device the processor includes at least a plurality of predefined data, at least a first one of which is representative of a predesignated one of the biometric characteristics of a first one of designated persons, and at least a second one of which is representative of a predesignated biometric characteristic of a second one of the designated persons, and said selection, of said corresponding authorization code, is contingent upon the processor detecting that the first and second predefined data are a substantial match with two encoded descriptions of biometric characteristics, whereby the portal unlocked is that which requires the presentation of predesignated biometric characteristics of two designated persons.

In accordance with a still further aspect of the invention, in the portable biometric device the processor includes at least a plurality of predefined data, at least a first one of which is representative of a predesignated one of the biometric characteristics of a first one of designated persons, and at least a second one of which is representative of a predesignated biometric characteristic of a second one of the designated persons, and said selection, of said corresponding authorization code, is contingent upon the processor detecting that a sequence of the first and second predefined data are a substantial match with a sequence of presentation of two encoded descriptions of the predesignated biometric characteristics of the first and second persons; whereby the portal unlocked is that which requires the presentation of predesignated biometric characteristics of two designated persons in a prescribed sequence.

In accordance with another aspect of the invention a portable biometric device is for use by a person having been designated with predefined data stored in a central controller, and corresponding to biometric characteristics of the person, wherein the central controller is operative for selectively unlocking any one of a plurality of portals, exclusive of any other one of the plurality of portals, for permitting access into and or egress from a secure entity in response to receiving a signal being representative of one of the biometric characteristics of the designated person. The portable biometric device comprising:

a biometric sensor for reading a biometric characteristic having been chosen and made available for reading by a person;

a digital encoder for encoding a reading of the biometric characteristic, from the biometric sensor, to provide an encoded description of the biometric characteristic;

a processor for encrypting the encoded description to provide an encrypted description in accordance with a predefined encryption key;

a wireless transceiver for transmitting the encrypted description to the central controller;

whereby the central controller is responsive to the biometric characteristic having been made available to the biometric sensor by said designated person for unlocking one of the portals.

In accordance with yet another aspect of the invention, a security system provides for security of an entity and or a service from indiscriminate access. The security system comprising:

a central controller for permitting access, via a portal of a plurality of portals, to the secure entity and or service, contingent upon a representation of a biometric characteristic having been transmitted thereto and substantially matching with a preregistered data, of a plurality of preregistered data being representative of biometric characteristics including said transmitted biometric characteristic, and, for selecting, from within said plurality of portals, a portal being associated with said matched preregistered data; and at least one portable biometric device including a wireless transmitter for transmitting a representation of a biometric characteristic having been made available by a person;

whereby a designated person is permitted entry and or egress via the selected portal in accordance with having made the designated biometric characteristic available to portable biometric device.

In accordance with still another aspect of the invention, a security system provides for security of an entity and or a service from indiscriminate access. The security system comprising:

a plurality of portals each being locked by a respective one of a plurality of locks, each lock being exclusively responsive to reception of one of a similar plurality of authorization codes for unlocking the portal;

at least one portable biometric device comprising:

a biometric sensor for reading a biometric characteristic of a person dependent upon the person presenting said biometric characteristic to the biometric sensor;

a digital encoder for encoding a reading of the biometric characteristic, from the biometric sensor, to provide an encoded description of the biometric characteristic;

a processor responsive to the encoded description of the biometric characteristic for determining if the biometric characteristic is one of a similar plurality of biometric characteristics predesignated for access via respective one of the plurality of portals, and if so, selecting the authorization code for unlocking said predesignated one of the portals;

a wireless transceiver for transmitting the selected authorization code;

whereby upon presentation of the predesignated biometric characteristic of personal choice the corresponding portal is unlocked.

In accordance with an additional aspect of the invention, a method for providing access to a secure entity or service by a designated person, via one of plurality of portals, each of which functions to open in response to a unique authorization signal, comprises the steps of:

initiating a portable biometric device with a plurality of predefined data representative of a plurality of biometric characteristic and each of which being designated for access via a respective one of the plurality of portals;

capturing a biometric information representative of a biometric characteristic in response a person presenting said information to the portable biometric device;

comparing the captured biometric information with said plurality of predefined data and;

if a substantial match with a one of the predefined data is detected, transmitting the unique authorization signal from the portable biometric device, whereby the respective portal is unlocked exclusive of any other portal in the plurality of portals.

In accordance with a supplementary aspect of the invention, a method for permitting entry and or egress exclusively via one of a plurality of portals of a secure entity and or a secure service, comprises the steps of:

providing each person in a population of designated persons with a portable biometric device operable to read a biometric characteristic presented thereto;

assigning a plurality of biometric characteristics of each designated person to respective portals of the plurality of portals; and subsequently, dependent upon a designated person presenting their portable biometric device with a biometric characteristic, performing a wireless information signal transmission of any predetermined frequencies within a range including infrared through radio frequency; and in an instance wherein information signal is representative of information corresponding substantially to one of the assigned ones of the plurality of biometric characteristics, causing the respective portal to be exclusively available for entry and or egress.

Further to this supplementary aspect of the invention the method comprises the further steps of:

personalizing the said portable biometric device by registering the assigned plurality of biometric characteristics of a designated person in their portable biometric device; and contingent upon the presented biometric characteristic matching substantially with one of the assigned ones of the plurality of biometric characteristics, performing said wireless information signal transmission wherein the signal information is an authorization signal for causing the respective portal to be exclusively available for entry and or egress.

BRIEF DESCRIPTION OF THE DRAWINGS

FIG. 3 is a block schematic diagram illustrating an example of functional electronic elements for providing a portable fingerprint security device as illustrated in FIGS. 2 and 2a;

REVIEW OF THE ILLUSTRATED PRIOR ART

Figures 1, 2, 2A:
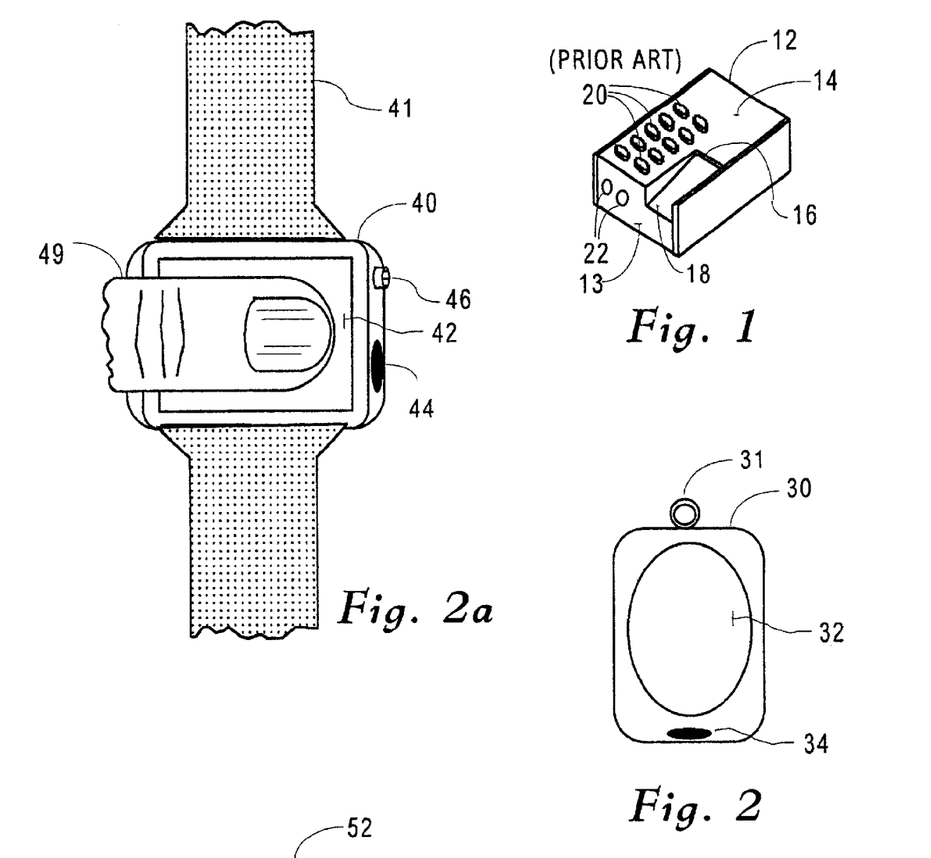
FIG. 1, labeled "PRIOR ART", shows a general example of previously known hand-held fingerprint security devices.
FIGS. 2 and 2a are each a pictorial illustration of a portable fingerprint security device for use with a security system in accordance with the present invention.

In FIG. 1, the hand-held fingerprint security device resides in a housing 12, which is about the size of a cigarette package or a deck of playing cards. The housing 12 includes a front wall 13 and an upper surface 14 with a fingerprint recognition area 16 having a transparent surface 18. A keypad is provided by push switches 20 in the upper surface 14. A wireless transceiver, for transmitting fingerprint information, is housed hidden beneath the upper surface 14 and includes transmit and receive ports at openings 22 in the front wall 13. The hand-held fingerprint security device overcomes the problem of destructive vandalism sometimes suffered by permanently mounted restrictive entry devices, however as previously mentioned, the hand-held security device is bulky. If it is made much smaller the push switches 20 become difficult to selectively operate as a persons finger will span several of them. Furthermore although it is desirable to provide an inexpensive mass producible hand-held portable device, reliable push switches are relatively expensive. If the push switches 20 are eliminated, the user no longer has control over which doors or portals can be opened. It is all or nothing.

DESCRIPTION OF THE EXAMPLE EMBODIMENTS

The term, secure entity, as used herein includes any of a large, small or remote facility, building, area, personal residence, installation, warehouse and the like, for which indiscriminate personal access is not intended. The term, secure service includes any of a communication function, automated teller, electronic commerce, electronic data base information deposit, manipulation or retrieval and the like of which indiscriminate personal usage is not intended.

In FIG. 2, the portable finger print device is housed in an ubiquitous object 30, for example in a decorative pendent. In another example the object 30 may be housed in combination with a time piece, either in the form of a pendent or a pocket watch. Whatever push buttons are required for the time piece function are small, infrequently used, and hence may be inexpensively provided. The upper surface of the object 30 is a transparent material which serves as a platen 32 for a transparent fingerprint scanner. The platen 32 allows the scanner to read a fingerprint, which is analyzed by a processor, not shown. The processor communicates via a transceiver, not shown, coupled through an infrared port 34.

In FIG. 2a, the portable fingerprint device is housed in an ubiquitous object, in this example within a housing 40 of a functional wristwatch which is typically secured to a person's wrist by a watch band 41. A front face of the housing 40 is a transparent platen 42 which provides a view of an underlying timepiece display, not shown, as well as carrying a biometric sensor in the form of capacitive array for sensing biometric characteristics of any of a person's digit tips. A fingertip 49 is shown positioned against the platen 42, as it would be for sensing of the finger's print. A processor, not shown, analyzes the finger print and may cause an authorization signal to be transmitted through an infrared port 44. In a different arrangement an antenna may be combined with the wrist strap 41 for radio frequency transmission of the authorization signal. A push switch 46 is shown as an example of push switches normally associated with a digital wrist watch, however the push switch 46 may also provide a security function.

Figure 3:
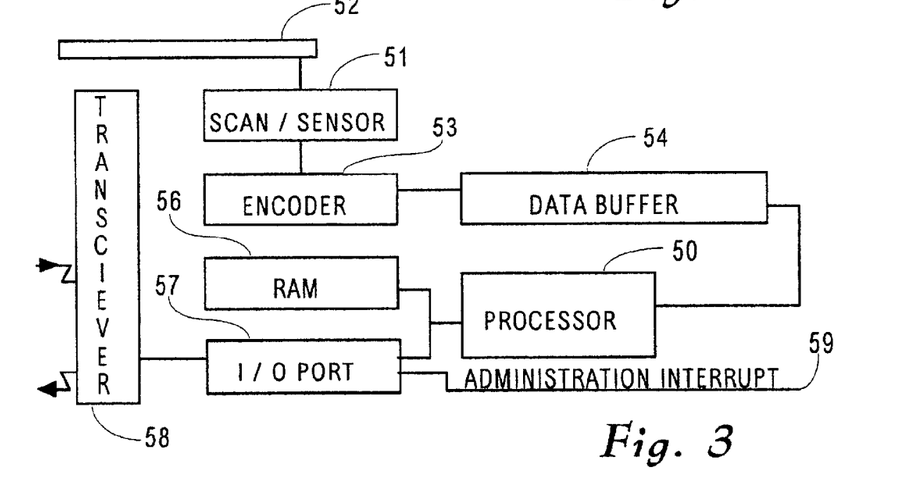

Referring to FIG. 3, a sensor array or scanner unit 52, for sensing a fingertip pattern or some other biometric characteristic, is coupled with a scan/sensor buffer 51 which is responsive to a processor 50 for operating the unit 52. In this example the scan/sensor buffer 51 receives an analog signal representation of a finger tip pattern and after transfers the captured signal to an encoder 53 which digitizes or otherwise converts the analog signal into a signal format which provides an encoded description of the biometric characteristic, suitable for processing. In one example the fingertip pattern is delivered from the scan unit 52 in an analog raster scan format of rows and columns. The encoder 53 digitizes the signal differentially. That is to say that as a row signal is sampled, the first sample is encoded as a zero. If the next sample is the same or less it is encoded as a zero but if it is more it is encoded as a one. The next sample is also encoded as a one unless it is less than the previous sample. The result is in binary code which is received by and stored in a data buffer 54, preparatory to signal processing by the processor 50. The processor 50 operates as directed by an instruction set maintained in a random access memory (RAM) 56. The RAM 56 has also been written with a record of a finger print characteristic of the intended user. In operation the processor 50 fetches a segment representative of a central row portion of the finger print characteristic from the RAM 56 and progressively compares the segment with a serial nondestructive row by row readout from the data buffer 54. The processor 50 keeps a running record of where in the serial readout any substantial matches are found. Subsequently in reference keyed to a position of either the best substantial row match or as an alternative the most central of a plurality of substantial row matches, the finger print characteristic from the RAM 56 is compared row segment after row segment from beginning to end with the binary code stored in a data buffer 54 to recognize any apparent corresponding segments. This process may be repeated several times, each by passing the binary code stored in a data buffer 54 keyed with a different apparent reference position until in any one such pass a sufficient number of row segments with apparent matches are realized to warrant a transmission of a predetermined authorization signal. If there are an insufficient number of apparently matching segments, transmission of an authorization signal is unwarranted. In a different example the Ram 56 is utilized with appropriate memory management performed by the processor 50 to provide the functions of the data buffer 54. The encoding and matching operation described in the forgoing is not essential. Other known methods may be found to be more convenient.

The portable fingerprint security device, as discussed in relation to the FIGS. 2a and 3, must be preauthorized for use with a particular security system and personalized for use by a particular person. Prior to operation the portable fingerprint security device is initialized by an administrator with the assistance of either a central computer or a personal computer. When the processor 50 is initially activated by the application of power as for example can be supplied from a watch battery (not shown in FIG. 2a) it is receptive to receiving instructions via a transceiver 58 coupled via an input output port 57. In this example the processor is caused to supervise the loading of the instruction set into the RAM 56. Then the pattern or print of a finger tip laid over the platen 42 where it is scanned or otherwise captured to provide a predefined data representative of a predesignated one of a user's biometric characteristic. The initial capture of the user's print occurs in response to an interrupt signal on the lead 59 which is generated when the user or the administrator presses the push switch 46. The digitized result is segmented by the processor and the segments are stored in a sequence of addressable locations in the RAM 56 and serves as the predefined data.

Figure 4:
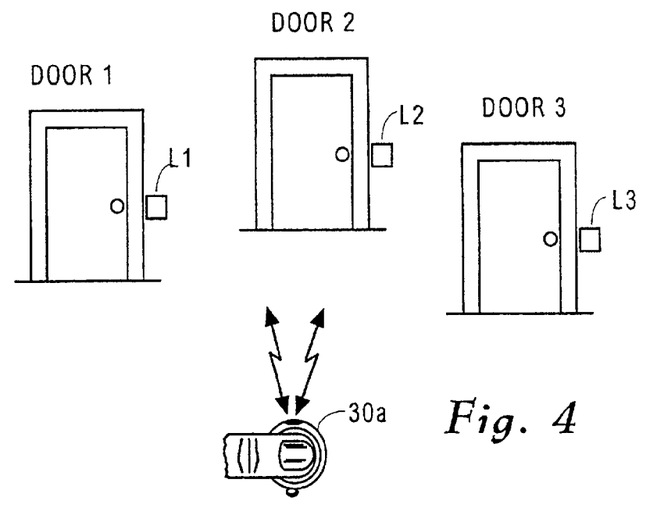
FIGS. 4 and 4a are block schematic diagrams of security systems wherein the portable fingerprint security devices illustrated in FIGS. 2 and 2a are useful.

One or a plurality of the predefined data representing different ones of the user's digits are captured in this manner, that is during the initialization. Each of the predefined data is assigned a distinct security access function. FIG. 4 shows doors 1, 2, and 3 having door locks L1, L2 and L3, respectively. The door locks although boldly illustrated in the drawing need not be visually identifiable in any actual installation. A portable fingerprint security device 30a has been initialized to be responsive to 3 different finger print patterns of the user for transmitting distinct authorization signals. Each of the locks L1, L2 and L3 is exclusively responsive to receiving the corresponding authorization signal to release for a time convenient for the user to open the door. In another example, not shown, each of a multitude of locked portals can be individually accessed, each of the associated door locks is responsive to a distinct authorization signal each of which is generated upon a combination of two or more digit patterns. Each combination of digit patterns is entered at the time of initialization in session with the administrator.

Figure 5:
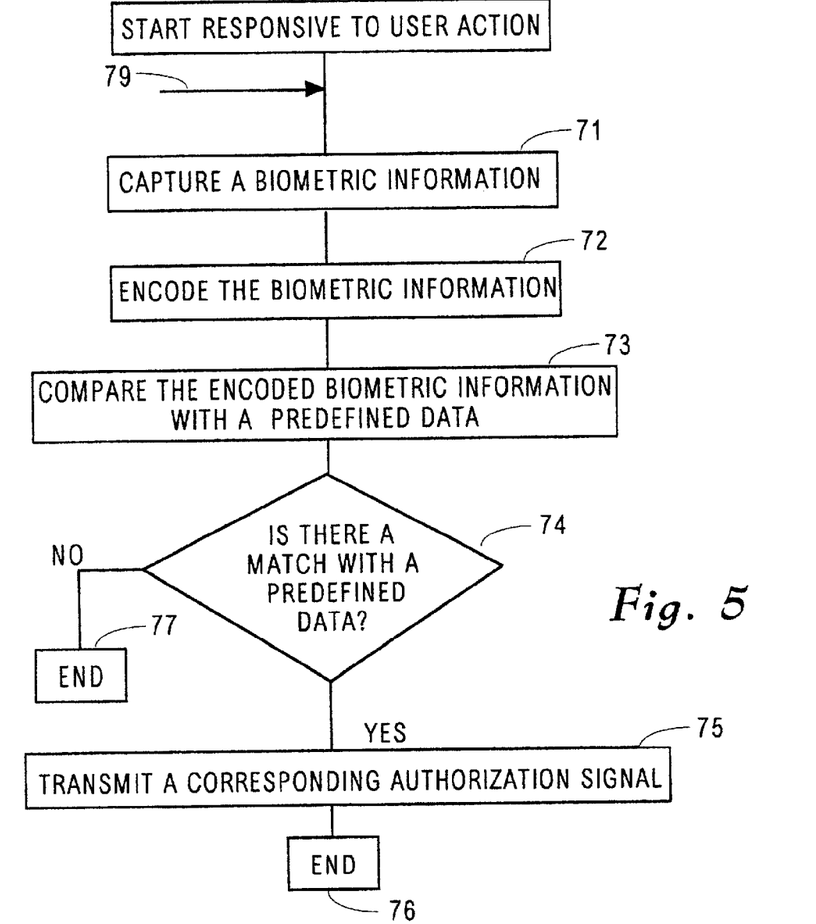
FIGS. 5 and 5a are flow diagrams of methods of operation of the portable fingerprint devices illustrated in FIGS. 2 and 2a used in conjunction with the security system in FIGS. 4 and 4a; and, FIG. 6 is a simplified flow diagram of a broad embodiment of the invention.
Figure 5A:
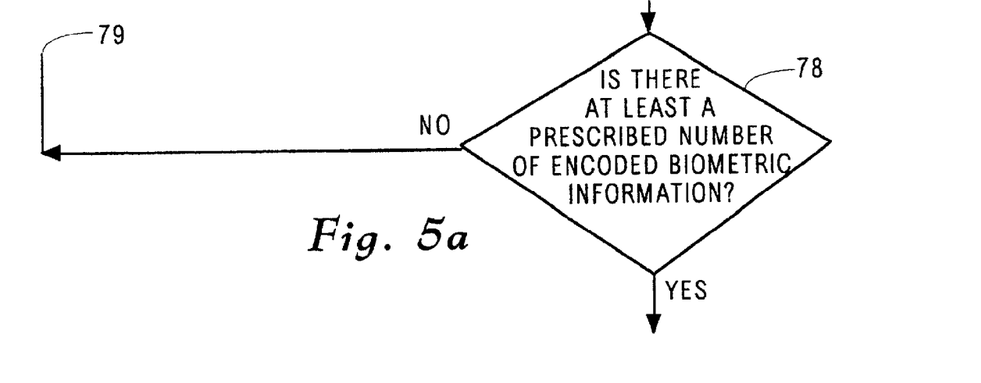

The flow diagram in FIG. 5 summarize a method of operation of the portable fingerprint devices illustrated in FIGS. 2 and 2a used in conjunction with the security system in FIG. 4, after the appropriate initialization procedure has been performed. A function block 70 starts the process in response, for example, to a touch of the user's digit to the platen 32 in FIG. 2, or the platen 42 in FIG. 2a. The process starts by capturing the user's biometric information as shown in a function block 71. As indicated in a function block 72 the biometric information is encoded and then, as stated in a function block 73, it is compared with one or more predefined data. One example of a method of comparison has been disclosed in the discussion of FIG. 3. If a substantial match is realised in accord with a decision block 74, the process ends at a block 77. In a variation wherein a plurality of fingerprints are expected from the user a decision block 77, as shown in FIG. 5a, is inserted between the blocks 72 and 73 in FIG. 5. In this example only after the required number of finger prints has been sensed will the comparison function commence.

Figure 4A:
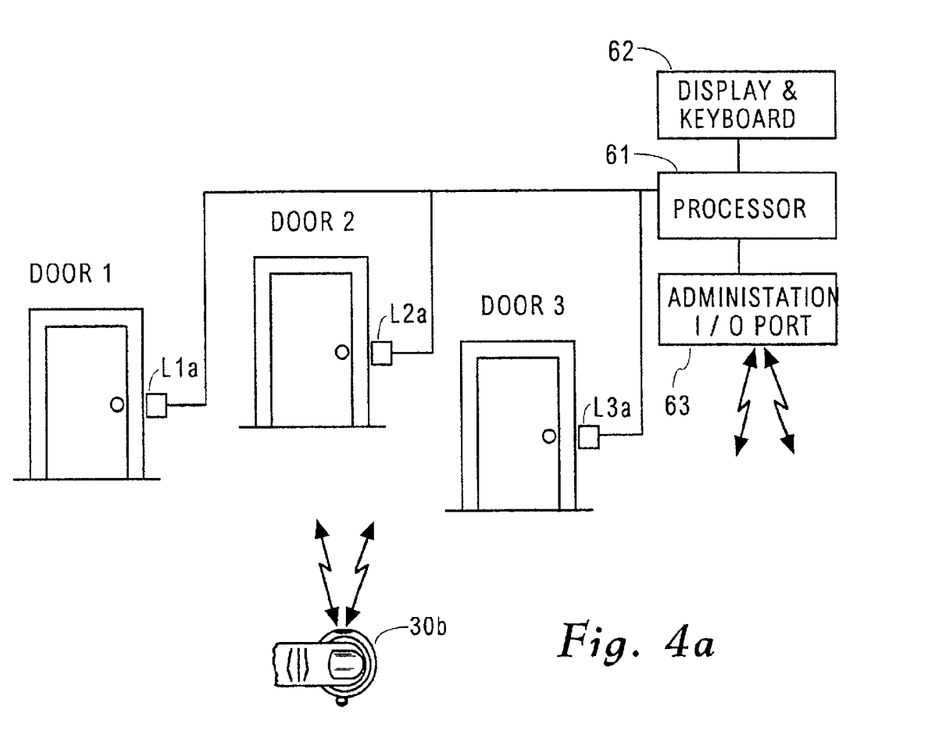

In another embodiment of a security system as illustrated in FIG. 4a. Only three portals of entry are shown for simplicity. Doors 1, 2 and 3 are equipped with door locks L1a, L2a and L3a, respectively. A common controller includes a processor 61 coupled with a display and keyboard 62, the door locks L1a, L2a, and L3a, and an administration input/output port 63 capable of communicating in the infrared or radio frequency spectrums. An appropriate common controller may be provided by a typical personal computer with little or no adaptation. In normal use a user's portable fingerprint device 30b in this example need only capture, digitize and encrypt the pattern of the user's finger tip before transmitting the encrypted pattern. A transmission is relayed, via a nearby one of the door locks or by any other convenient receiver, to the common controller. The processor 61 is programmed to perform finger print analysis, as previously discussed, or in accordance with any one of several known processes for identifying an individual for one or more of their finger pattern characteristics. When an authorized user's desire for entry is validated the appropriate one of the door locks is released for an appropriate period of time. Before the user's portable fingerprint device 30b is functional it must first be initialized along with the common controller. Communications between the user's portable fingerprint device 30b and the common controller are accomplished via the administration input/output port 63. One after another several different finger patterns of the user are usually scanned, digitized and transferred from the device 30b via the port 63. After the desired data has been captured in the common controller an encryption key is transmitted to the user's portable fingerprint device 30b. Thereafter transmissions from the device 30b and or intended for the device 30b are normally encrypted in accordance with the encryption key. The encryption key may be altered from time to time if desired.

It is possible to envision many limited access control applications for the present invention. Among them, one can cite: computer centres; bio-hazardous areas; airport freight areas; hospital-closed areas and drug storage areas; office buildings, particularly outside of normal working hours; safety deposit boxes and vaults; and computer terminal entry or information, access to information, and access to financial services.

Figure 6:
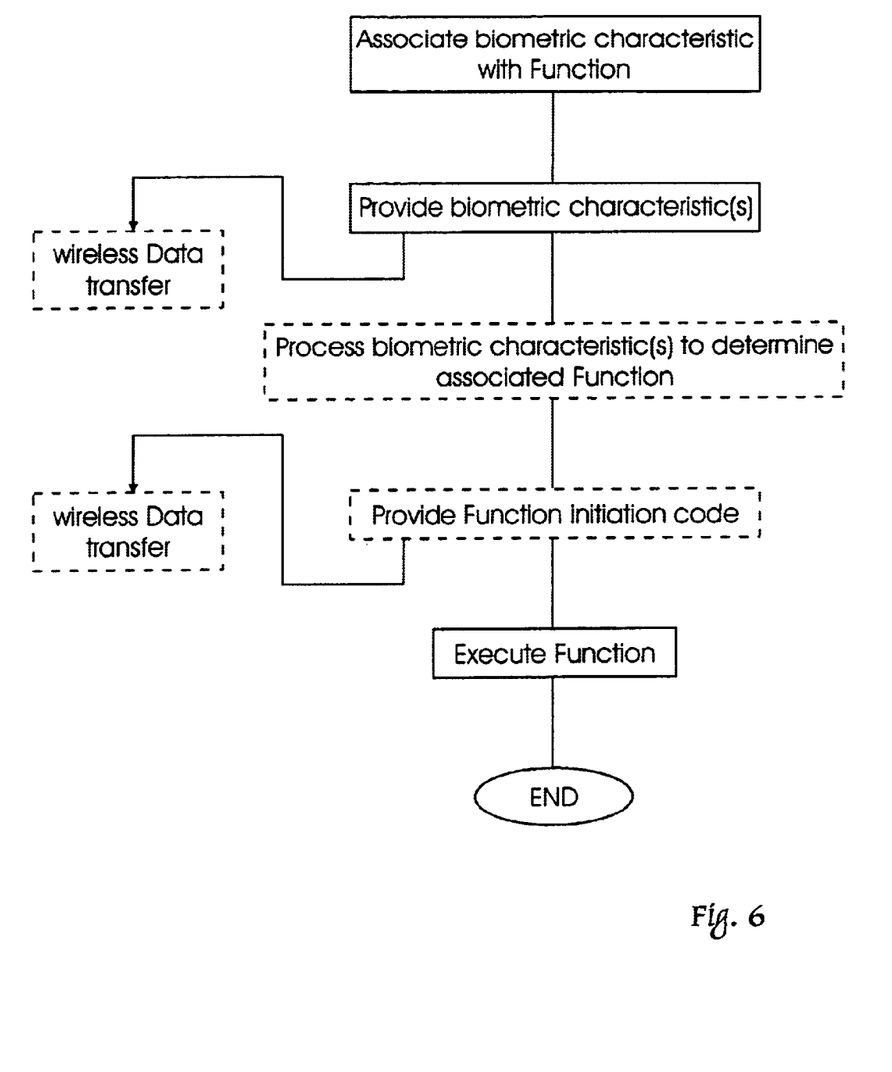

Referring to FIG. 6, a flow diagram is presented. A user is provided with a number of functions each accessible by transmission of a unique access code for executing that function. As described above, typical functions include unlocking of doorways where each function unlocks a different doorway. That said, functions may include turning on and off lights, engaging security systems, checking email, checking voicemail, logging into a computer system, locking doors, unlocking a car, and so forth. Some functions are secure functions—requiring security operations—while others are optionally general access functions like turning a light on or off. The user associates each function with a biometric information source or with a sequence of provided biometric information. Thus, turning on a light may be associated with left index finger-left index finger, logging into a computer with left thumb—left index finger, and so forth. Each fingerprint is a biometric characteristic of the user.

The user provides a biometric sample of a biometric characteristic—or in this case two consecutive samples—and the samples are provided to a processor. The processing step is shown in dashed line because it is either part of the hand held portable biometric sensor device or part of the receiving device. As such, wireless data transfer is shown both before and after the processing step also in dashed line as the step may occur either before or after. The wireless transfer of data does not affect implementation of the invention and its sequence is not important.

Processing of the data allows for determination of which biometric characteristics were provided and association with access codes for effecting a predetermined function. For example, if the biometric characteristics are left thumb-left index finger, then the computer is logged into automatically. Advantageously according to the invention, no other function is executed with the computer logon operation since other functions are associated with other sequences of biometric characteristics.

Alternatively, a single sequence of biometric characteristics is associated with more than one function. For example a store owner may associate one sequence with opening the store in the morning effecting system start-up, turning on lights, unlocking doors, disabling the alarm, and so forth. Another sequence is associated with locking the store at the end of the day effecting system shut-down, turning out the lights, enabling the alarms, etc.

Skilled persons, becoming knowledgeable of the foregoing disclosure, will envision various and numerous embodiments within the spirit and scope of the present invention, the breadth of which is of record in the appended claims.

What is claimed is:

1. A portable biometric device, for use by a designated person in combination with a device or service accessible via at least one of a plurality of unique access, comprising:

a biometric sensor for reading a biometric characteristic of a person dependent upon the person presenting said biometric characteristic to the biometric sensor;

a digital encoder for encoding a reading of the biometric characteristic, from the biometric sensor, to provide an encoded description of the biometric characteristic;

a processor responsive to the encoded description of the presented biometric characteristic for determining if the biometric characteristic is predesignated for accessing a device or service, and if so, selecting the authorization code for accessing said device or service;

a wireless transceiver for transmitting the selected authorization code;

whereby said designated person, exclusive of an other person, is able to choose which device or service of a plurality of devices and/or services to access by providing different biometric characteristics.

2. A portable biometric device as defined in claim 1 wherein different biometric characteristics include fingerprints of different fingertips of a same individual.

3. A portable biometric device for use by a person having been designated with predefined data stored in a central controller, and corresponding to biometric characteristics of the person, wherein the central controller is operative for selectively accessing any one of a plurality of devices and/or services, exclusive of any other one of the plurality of the devices and/or services, for permitting access to said device or service in response to receiving a signal being representative of one of the biometric characteristics of the designated person, the portable biometric device comprising:

a biometric sensor for reading a biometric characteristic having been chosen and made available for reading by a person;
  a digital encoder for encoding a reading of the biometric characteristic, from the biometric sensor, to provide an encoded description of the biometric characteristic;
  a processor for encrypting the encoded description to provide an encrypted description in accordance with a predefined encryption key;
  a wireless transceiver for transmitting the encrypted description to the central controller;
  whereby the central controller is responsive to the biometric characteristic having been made available to the biometric sensor by said designated person for accessing one of the devices or services, said one device or service associated with the biometric characteristic and wherein another device or service from the plurality of devices and/or services is associated with another different biometric characteristic.

4. A portable biometric device as defined in claim 3 wherein different biometric characteristics include fingerprints of different fingertips of a same individual.

5. A method for permitting access to functions of at least a device, comprising the steps of:

assigning a plurality of different biometric characteristics of a person, each to different access codes, an access code relating to a function of the at least one device;
  providing to a portable biometric device operable to read a biometric characteristic presented thereto and to provide biometric data based on a read biometric characteristic, a biometric characteristic of an individual;
  processing the biometric data to determine an access code associated therewith;
  transmitting an information signal of the access code via wireless transmission to the device; and,
  in response to receipt of the information signal including the access code performing the function on the device.

6. A method for permitting access to functions of at least a device as defined in claim 5 wherein different biometric characteristics include fingerprints of different fingertips of a same individual.

7. A method for permitting access to functions of a device, comprising the steps of:

assigning a plurality of different biometric characteristics of a person, each to different access codes, an access code relating to a function of the at least one device;
  providing a biometric characteristic of an individual to a portable biometric device operable to read a biometric characteristic presented thereto and to provide biometric data based on a read biometric characteristic;
  processing the biometric data to provide security data;
  transmitting an information signal of the security data via wireless transmission to the device; and,
  in an instance wherein information signal is representative of security data corresponding to one of the assigned ones of the plurality of biometric characteristics, causing the respective function to be executed on the respective device.

8. A method for permitting access to functions of at least a device as defined in claim 7 wherein different biometric characteristics include fingerprints of different fingertips of a same individual.

9. A portable biometric device, for use by a designated person in combination with a secure entity and or a secure service, which is accessible via a plurality of portals, each of which is exclusively operable in response to a corresponding authorization code, comprising:

a biometric sensor for reading a biometric characteristic of a person dependent upon the person presenting said biometric characteristic to the biometric sensor;
  a digital encoder for encoding a reading of the biometric characteristic, from the biometric sensor, to provide an encoded description of the biometric characteristic;
  a processor responsive to the encoded description of the presented biometric characteristic for determining if the biometric characteristic is predesignated for access via a predesignated one of the plurality of portals, and if so, selecting the authorization code for unlocking said predesignated one of the portals;
  a wireless transceiver for transmitting the selected authorization code to the secure entity and or service;
  whereby said designated person, exclusive of an other person, is able to choose which of the plurality of portals is to be unlocked for their access.

10. A portable biometric device, as defined in claim 9, wherein the biometric sensor is for reading a plurality of biometric characteristics presented in sequence; the digital encoder provides an encoded description of the sequence of biometric characteristics; and the processor is for determining if the presented sequence of biometric characteristics is predesignated for their access.

11. A portable biometric device as defined in claim 9, wherein the processor includes at least a plurality of predefined data each representative of a predesignated one of the biometric characteristics and wherein said selection of said corresponding authorization code is contingent upon the processor detecting a substantial match between the encoded description and a one of the plurality of predefined data.

12. A portable biometric device as defined in claim 9, wherein the biometric sensor is for reading a sequence of presented biometric characteristics; the digital encoder provides an encoded description of the sequence of biometric characteristics; wherein the processor includes at least a plurality of predefined data each representative of a predesignated one of the biometric characteristics of the designated person, and said selection, of said corresponding authorization code, is contingent upon the processor detecting a substantial match between the encoded description of the sequence of biometric characteristics and a similar sequence of ones of the plurality of predefined data.

13. A portable biometric device as defined in claim 12, for use by designated persons, wherein the processor includes at least a plurality of predefined data, at least a first one of which is representative of a predesignated one of the biometric characteristics of a first one of the designated persons, and at least a second one of which is representative of a predesignated biometric characteristic of a second one of the designated persons, and said selection, of said corresponding authorization code, is contingent upon the processor detecting that the first and second predefined data are a substantial match with two encoded descriptions of biometric characteristics, whereby the portal unlocked is that which requires the presentation of predesignated biometric characteristics of two designated persons.

14. A portable biometric device as defined in claim 12, for use by designated persons, wherein the processor includes at least a plurality of predefined data, at least a first one of which is representative of a predesignated one of the biometric characteristics of a first one of the designated persons, and at least a second one of which is representative of a predesignated biometric characteristic of a second one of the designated persons, and said selection, of said corresponding authorization code, is contingent upon the processor detecting that a sequence of the first and second predefined data are a substantial match with a sequence of presentation of two encoded descriptions of the predesignated biometric characteristics of the first and second persons;

whereby the portal unlocked is that which requires the presentation of predesignated biometric characteristics of two designated persons in a prescribed sequence.

15. A portable biometric device for use by a person having been designated with predefined data stored in a central controller, and corresponding to biometric characteristics of the person, wherein the central controller is operative for selectively unlocking any one of a plurality of portals, exclusive of any other one of the plurality of portals, for permitting access into and or egress from a secure entity in response to receiving a signal being representative of one of the biometric characteristics of the designated person, the portable biometric device comprising:

a biometric sensor for reading a biometric characteristic having been chosen and made available for reading by a person;

a digital encoder for encoding a reading of the biometric characteristic, from the biometric sensor, to provide an encoded description of the biometric characteristic;

a processor for processing the encoded description to provide secure data relating to the encoded description;

a wireless transceiver for transmitting the secure data to the central controller;

whereby the central controller is responsive to the biometric characteristic having been made available to the biometric sensor by said designated person for unlocking one of the portals.

16. A portable biometric device as defined in claim 15, wherein the processor includes an encryptor for encrypting the encoded description to provide an encrypted description in accordance with a predefined encryption key, the encrypted description forming at least a part of the secure data.

17. A portable biometric device as defined in claim 16, wherein each of said predefined data corresponds to a sequence of biometric characteristics, and wherein, the biometric sensor is for reading biometric characteristics as made available in sequence, the digital encoder provides an encoded description of the sequence of biometric characteristics; whereby the central controller is responsive to said sequence of biometric characteristics.

18. A security system for securing an entity and or a service from indiscriminate access, the security system comprising:

a central controller for permitting access, via a portal of a plurality of portals, to the secure entity and or service, contingent upon a representation of a biometric characteristic having been transmitted thereto and substantially matching with a preregistered data, of a plurality of preregistered data being representative of biometric characteristics including said transmitted biometric characteristic, and, for selecting, from within said plurality of portals, a portal being associated with said matched preregistered data; and at least one portable biometric device including a wireless transmitter for transmitting a representation of a biometric characteristic having been made available by a person;

whereby a designated person is permitted entry and or egress via the selected portal in accordance with having made the designated biometric characteristic available to portable biometric device.

19. A security system for securing an entity and or a service from indiscriminate access, the security system comprising:

a plurality of portals each being locked by a respective one of a plurality of locks, each lock being exclusively responsive to reception of one of a plurality of authorization codes for unlocking the portal;

at least one portable biometric device comprising:

a biometric sensor for reading a biometric characteristic of a person dependent upon the person presenting said biometric characteristic to the biometric sensor;

a digital encoder for encoding a reading of the biometric characteristic, from the biometric sensor, to provide an encoded description of the biometric characteristic;

a processor responsive to the encoded description of the biometric characteristic for determining if the biometric characteristic is one of a similar plurality of biometric characteristics predesignated for access via respective one of the plurality of portals, and if so, selecting the authorization code for unlocking said predesignated one of the portals;

a wireless transceiver for transmitting data;

wherein one of the encoded description of the biometric characteristic and the selected authorization code is for transmission via the wireless transceiver, and whereby upon presentation of the predesignated biometric characteristic associated with a portal a receiver associated with which is within range of the wireless transceiver, the portal is unlocked.

20. A security system as defined in claim 19 wherein the digital encoder is for encrypting data to provide secure encoded data.

21. A method for providing access to a secure entity or service by a designated person, via one of plurality of portals, each of which functions to open in response to a unique authorization signal, the method comprising the steps of:

initiating a portable biometric device with a plurality of predefined data representative of a plurality of biometric characteristics, each of which is associated with a unique authorisation code designated for access via a respective one of the plurality of portals;

capturing biometric information of an individual representative of a biometric characteristic in response a person presenting said information to the portable biometric device;

comparing the captured biometric information with said plurality of predefined data and;

if a substantial match with a one of the predefined data is detected, transmitting the unique authorization code from the portable biometric device, whereby the respective portal is unlocked exclusive of any other portal in the plurality of portals.

22. A method for permitting entry and or egress exclusively via one of a plurality of portals of a secure entity and or a secure service, comprising the steps of:

provjding each person in a population of designated persons with a portable biometric device operable to read a biometric characteristic presented thereto;

assigning a plurality of biometric characteristics of each designated person to respective portals of the plurality of portals; and subsequently, dependent upon a designated person presenting their portable biometric device with a biometric characteristic, transmitting a wireless information signal; and in an instance wherein the wireless information signal is representative of information corresponding substantially to one of the assigned ones of the plurality of biometric characteristics, causing the respective portal to be exclusively available for entry and/or egress.

23. A method for permitting entry and or egress exclusively via one of a plurality of portals of a secure entity and or a secure service as defined in claim 22, wherein the information signal transmitted is an encryption of a reading of the presented biometric characteristic.

24. A method for permitting entry and or egress exclusively via one of a plurality of portals of a secure entity and or a secure service as defined in claim 22, further comprising the steps of:

personalizing the said portable biometric device by registering the assigned plurality of biometric characteristics of a designated person in their portable biometric device; and contingent upon the presented biometric characteristic matching substantially with one of the assigned ones of the plurality of biometric characteristics, performing said wireless information signal transmission wherein the signal information is an authorization signal for causing the respective portal to be exclusively available for entry and or egress.

* * * * *